June 8, 1965 A. K. BERGMANN 3,188,397

TELEPHONE SYSTEM FOR CENTRALIZING OF PBX-EXCHANGES

Filed Dec. 22, 1960 5 Sheets-Sheet 1

INVENTOR
ANDERS KARLBY BERGMANN
BY Hane and Nydick
ATTORNEYS

June 8, 1965 A. K. BERGMANN 3,188,397

TELEPHONE SYSTEM FOR CENTRALIZING OF PBX-EXCHANGES

Filed Dec. 22, 1960 5 Sheets-Sheet 2

INVENTOR
ANDERS KARLBY BERGMANN
BY Hane and Nydick
ATTORNEYS

June 8, 1965 A. K. BERGMANN 3,188,397

TELEPHONE SYSTEM FOR CENTRALIZING OF PBX-EXCHANGES

Filed Dec. 22, 1960 5 Sheets-Sheet 3

INVENTOR
ANDERS KARLBY BERGMANN
BY Hane and Nydick
ATTORNEYS

INVENTOR
ANDERS KARLBY BERGMANN
BY Hane and Nydick
ATTORNEYS

INVENTOR
ANDERS KARLBY BERGMANN
BY Hane and Nydick
ATTORNEYS

United States Patent Office
3,188,397
Patented June 8, 1965

3,188,397

TELEPHONE SYSTEM FOR CENTRALIZING OF PBX-EXCHANGES

Anders Karlby Bergmann, Galion, Ohio, assignor to Telefonaktiebolaget L M Ericsson, Stockholm, Sweden, a corporation of Sweden Filed Dec. 22, 1960, Ser. No. 77,607
Claims priority, application Sweden, Dec. 23, 1959, 12,126
3 Claims. (Cl. 179—27)

This invention relates to a circuit arrangement for automatic telephone exchanges wherein some of the subscribers have each several lines and several subscriber's instruments.

When a subscriber's telephone traffic exceeds the traffic that can be carried by one line, two or more lines must be arranged. These lines can be arranged as ordinary subscriber's lines each with at least one telephone instrument, or as junction lines to a PBX exchange. If a number of ordinary lines are arranged, the traffic between the lines passes selectors in the telephone system, constituting traffic between lines belonging to different subscribers. In a PBX exchange, incoming calls are handled by a switchboard located at the subscriber, and calls between the instruments of the subscriber are connected by means of switching means in the PBX exchange. However, many small separate exchanges do not constitute an economical solution of the problem.

The operator's instrument in a small PBX exchange can be an ordinary telephone instrument to which incoming calls are automatically directed. The operator transfers the call to the subscriber's instrument at which the call is to be answered. The PBX exchange in this case must be equipped with means for call-back or inquiry calls and means to transfer a call on a junction line to any subscriber's instrument connected to the PBX exchange.

It is an object of the invention to replace small and to a certain extent also medium-sized PBX exchanges arranged to cooperate with an automatic public telephone exchange, by selecting means which are common to several PBX exchanges and belong to the public telephone exchange, and which comprise means to transfer incoming calls and means to hold an incoming call during a local inquiry call. All subscriber's instruments belonging to one and the same PBX subscriber are connected to the public telephone exchange through one line for each instrument, and incoming calls are received on one of the lines of the PBX subscriber and are switched from this line to the other lines belonging to the same PBX subscriber by means of the switching means in the public exchange and by means of signals from that subscriber's instrument which receives the call.

In the event of large internal traffic of the PBX subscribers it is advisable to arrange special switching paths besides the usual switching paths of a public telephone exchange for the local traffic of the PBX subscribers. Each subscriber's line has a multiple-digit number in the public exchange, but the PBX subscribers who have substantial internal traffic may want to connect their internal calls by means of a short telephone number selected according to the number of instrumetns, for instance, one digit when the number of lines does not exceed ten.

According, the invention resides in a telephone exchange comprising registers and markers and a number of larger groups of subscriber's lines, in which said PBX-subscriber's lines are included and in which each subscriber's line has a many-digits number, and also has for communications between two lines belonging to the same PBX-subscriber, a short number. The communications between lines belonging to different subscribers are connected by means of said many-digits number preceded by a direction digit. At least said short numbers and said direction digit are received and registered in said register and from there transferred to said marker, which establishes the communication.

The purpose of the invention is accomplished by means of a group relay XR for each PBX-subscriber and arrangements for actuating said group relay from the register, when the register transfers the called number to the marker, at least for each communication that is connected by means of a short number from one of the lines of the PBX-subscriber, and further by means of a contact means that is actuated by said group relay and closes a circuit to the marker for identifying the position of the called subscriber in the multiple of the telephone exchange with the guidance of said short number and said group relay.

The invention will be further described with reference to the attached drawings, including FIGS. 1 to 5, whereof FIGS. 1–3 form a continuous diagram of the telephone exchange when placed adjacent to each other in numerical order. FIG. 4 shows in detail the network SRC in FIG. 2.

More specifically:

Figure 1:
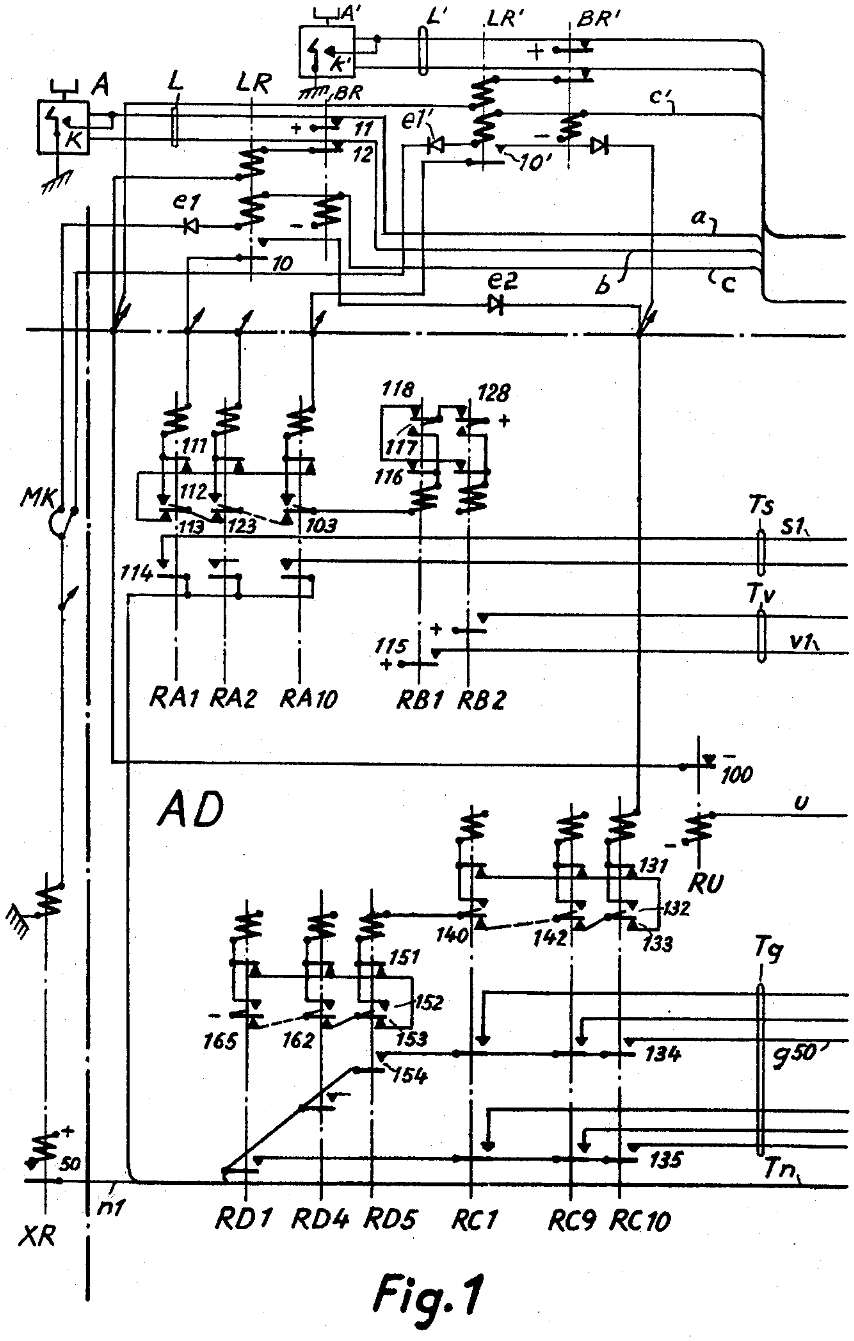
FIG. 1 shows a subscriber's line having a subscriber's instrument, a line equipment and a calling identifier.

In FIG. 1 there are shown a subscriber's line L, a subscriber's instrument A, a subscriber's line equipment comprising a line relay LR, a cutoff relay BR, a group relay XR for a PBX-subscriber and a call identifier AD for 1000 subscriber's lines comprising two relay groups RA1–RA10, a relay group RB1–RB2, five relay groups RC1–RC10 and a relay group RD1–RD5 and a blocking relay RU. The relay groups indicate the positions of the lines in the multiple, whereby operating bars in crossbar switches having 20 lines arranged at two stages with 10 lines each, are used. The relays RB1–RB2 indicate the stage and RA1–RA10 indicate selecting magnets in a 20-group. The relays RC1–RC10 and RD1–RD5 indicate the 50 different 20-groups in a group of 1000 subscribers. FIG. 1 shows a second subscriber's equipment A′, L′, LR′, BR′.

The subscriber's instrument A is equipped with a dial for impulse sending or with a key set for voice frequency signal sending and with a push button K for sending a particular switching signal, for example by connecting the one speaking wire of the subscriber's line to ground.

Figure 2:
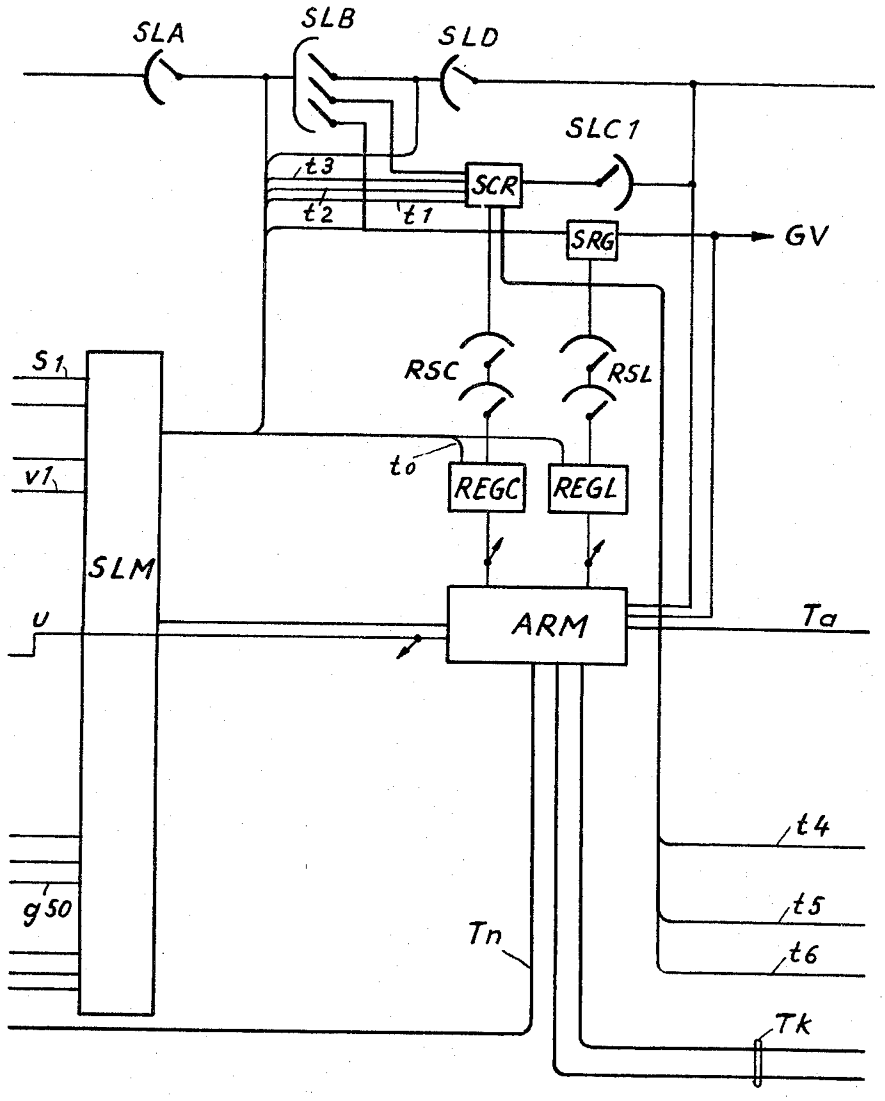
FIG. 2 shows the switching paths in an automatic telephone exchange.

In FIG. 2 there are shown a combined finding-and line selecting stage SLA–SLB for a group of 1000 subscriber's lines and a selecting stage for mixing the local traffic in the group and the incoming traffic to the group. The last-mentioned selecting stage is built of primary selectors SLC1 for the local traffic and SLC2 in FIG. 3 for the incoming traffic and of secondary selectors SLD. Furthermore there are provided link circuits SCR and registers REGC for the local traffic and link circuits SRG and registers REGL for the outgoing traffic. The registers are connected to the link circuit through selectors RSC and RSL respectively. For each group of 1000 subscriber's lines there are provided a marker SLM for selection of a disengaged link circuit and of a disengaged register and for setting of the selectors SLA, SLB, RSC and RSL. Common to several 1000-groups there is a marker ARM for converting the called subscriber's numbers into multiple positions.

Figure 3:
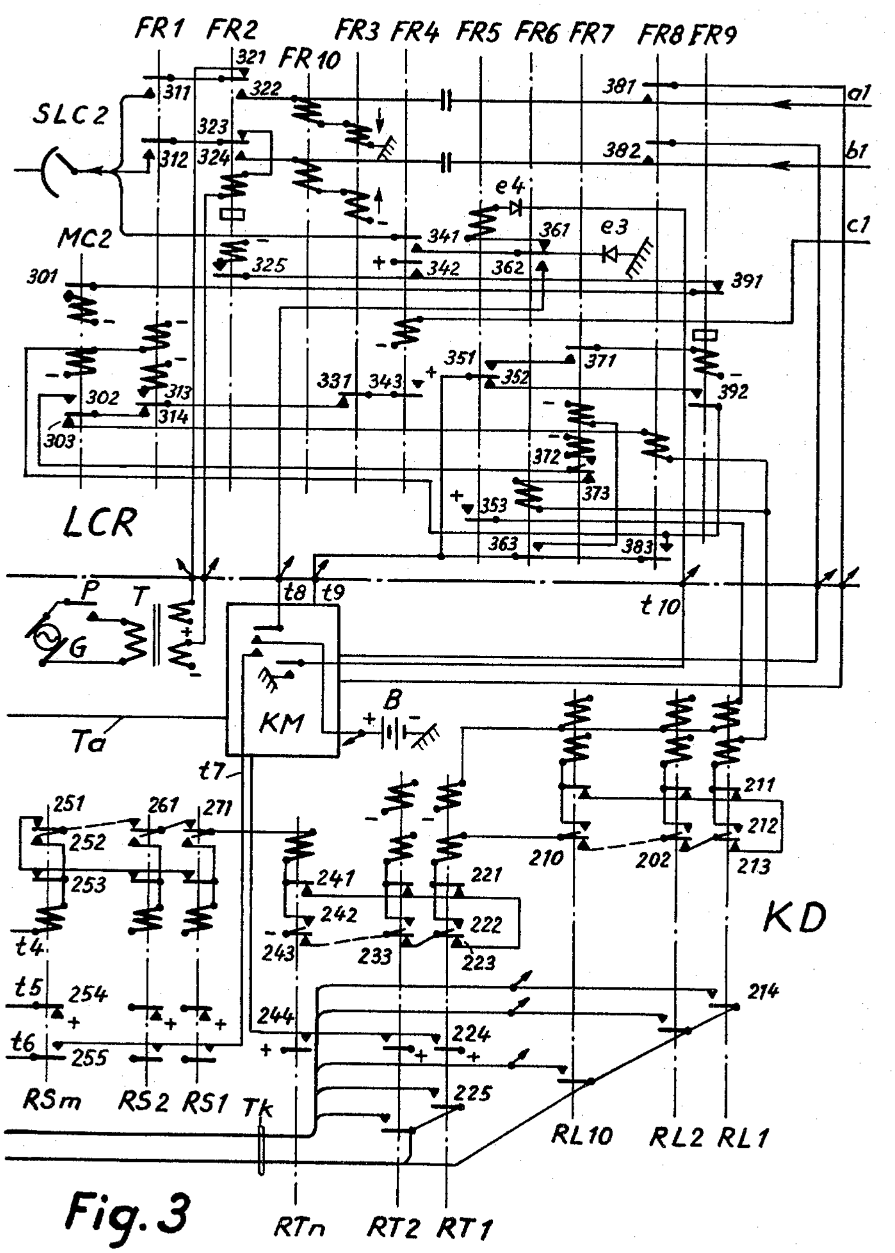
FIG. 3 shows the line equipment of an incoming junction line, an identifier for junction lines and connecting relays for link circuits for local communications.

In FIG. 3 are shown a line equipment LCR for a three-conductor junction line *a1*, *b1*, *c1*, an identifier KD for junction lines comprising a number of relay groups RL1–RL10 and a relay group RT1–RT$n$ which is common to said relay groups, a translator KM and connecting relays RS1–RS$m$ for connecting the local link circuits SCR to the translator KM.

The arrangements shown in FIGS. 1–3 co-operate as follows: The selectors SLA, SLB, SLC, SLD are operating bars in crossbar switches. At a call from the subscriber's instrument A the line L is connected through selectors SLA–SLB to a local link circuit SCR that in its turn is connected to a register REGC through selectors RSC. Dialling tone is sent from the register REGC, whereupon numerical signals are sent from A to REGC. For an outgoing call from a PBX-subscriber the direction digit 0 is selected and a new dialling tone is awaited.

Figure 5:
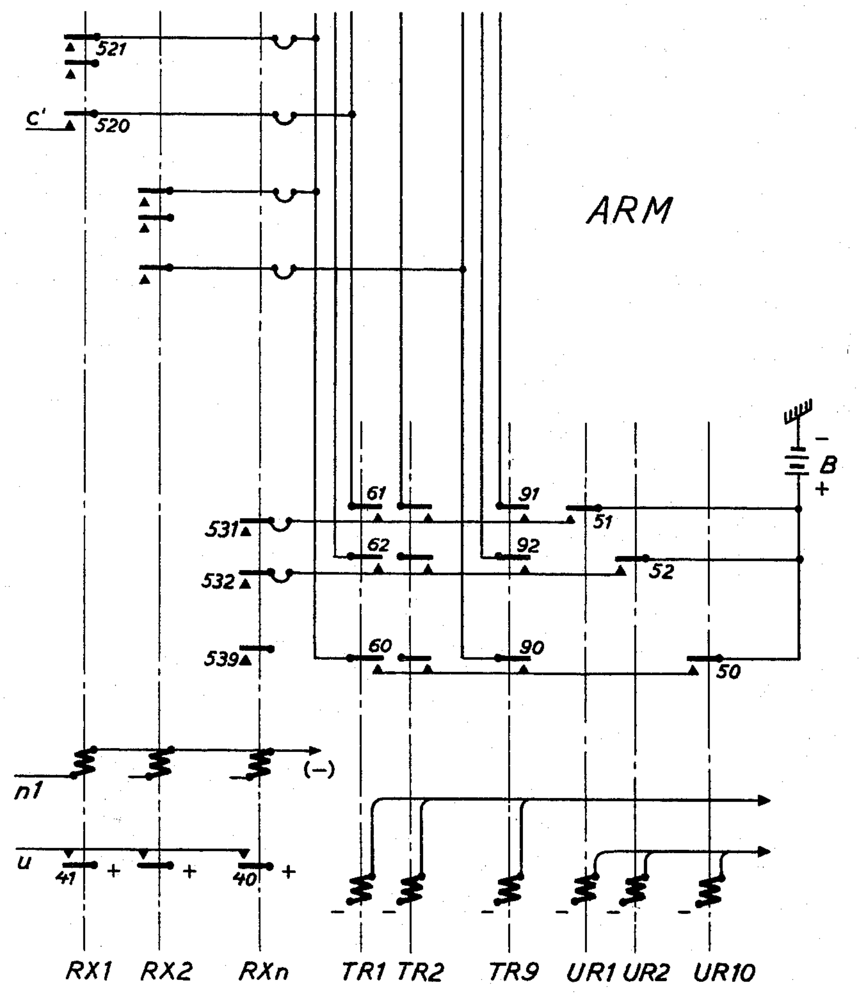
FIG. 5 shows a translator for calls between lines belonging to the same PBX-subscriber.

If a local call is intended between the subscriber's instrument A and a subscriber's instrument A′ (FIG. 1) belonging to the same PBX-subscriber, the register REGC connects itself to the marker ARM and transfers the called subscriber's number to the marker, whereupon ARM sets up a communication between SCR and the called subscriber's line though selectors SLC1, SLD, SLB and SLA. Here it is however presupposed that the subscribers at internal calls should not have to dial a complete, that is perhaps a 6-digits subscriber's number, but only have to dial a one-digit-, two-digits- or three-digits line number in dependence on the number of lines belonging to the PBX-subscriber. When the marker ARM from a register REGC receives such a one-digit-, two-digits- or three-digits number instead of the direction digit 0, a positive potential is connected through the register REGC and the link circuit SRC to the $c$-wire of the calling subscriber's line, whereby a circuit is closed to ground through the lower winding of the line relay LR, the rectifier $e1$, an intermediate circuit MK and the upper winding of the group relay XR. The group relay XR operates in this circuit and the contact 50 in FIG. 1 is closed. By combining a circuit through the contact 50 and the wire $n1$ with the registering of the local number received from REGC, the marker ARM can ascertain the multiple position of the called subscriber's number. The marker ARM then sets up a communication between SCR and the called subscriber's line through line L′ through selectors SLC1, SLD, SLB and SLA. The identification of the called subscriber's line is carried out by connecting said positive potential from a battery B in FIG. 5 to the $c$-wire of the called line. In the marker ARM at one-digit numbers one of the relays UR1–UR9 operates and at two-digits numbers furthermore one of the relays TR1–TR9. At the same time a second group relay RX1 is operated by said circuit through the wire $n1$. This relay operates a make contact 521–520 for each line that belongs to that PBX-subscriber, from which the call is coming. Each of the relays RX1–RX$n$ in FIG. 5 corresponds to a PBX-subscriber. If the PBX-subscriber has more than 9 lines, two-digits numbers will be necessary for internal calls. For example the relays RX1, TR1 and UR1 operate through signals from the register REGC. The contacts 521–520, 61–60 and 51 close. The contact 520 is through an intermediate circuit connected to the contact 61, and therefore the following circuit is completed: the battery B, the contacts 51, 61, 520, the wire $c$ that corresponds to the $c$-wire in FIG. 1 for the called line L′, the lower winding of the relay LR′ and the rectifier $e1'$ of the called line, the intermediate circuit MK to ground through the upper winding of the relay XR that is already operated by a short current impulse through the $c$-wire from the calling line and is kept energized through its lower winding and the contact 50. At the same time the relay RU is operated in a circuit from +, the contact 41, the wire $u$, the winding of relay RU, to negative. The line relay LR′ of the called line L′ operates and the contact 10′ is closed and the relays of the calling identifier AD mark the multiple position of the called line as will be described below in connection with calls from the line L. The relay RX$n$ in FIG. 5, corresponds to a PBX-subscriber having less than 10 lines and thus one-digit calling numbers for local calls. The register REGC determines through particular signals in a manner known per se whether the call refers to a one-digit or to a two-digits PBX-subscriber, for example through a signal on a fourth multiple wire which is not shown in FIG. 1 but which is necessary for the call charging calls from the subscriber's instrument A.

According to another embodiment of the invention the individual, many digits number of the calling PBX-line is registered in the register REGC at the call in a manner known per se, for example in order to be used later on for the charging of a possible trunk call with the aid of automatic printing registers. The number registered in the register is transferred to the marker simultaneously with the called, short subscriber's number for local calls. With the guidance of the number of the calling subscriber's line and a translator or an intermediate frame for individual circuits for the subscriber's numbers the marker operates the group relay of the PBX-subscriber.

If the call refers to an outgoing communication, the calling subscriber will dial the direction digit 0 and awaits a new dialling tone. The register REGC connects itself, when the digit 0 has been received, to the marker ARM that selects a disengaged link circuit SRG for outgoing traffic. At the same time the calling subscriber's line is identified by means of said positive potential on the $c$-wire through the link circuits SCR, whereby the line relay LR is operated and the calling line L is identified. The marker connects a communication between the calling subscriber's line L and the selected link circuit SRG and connects a register REGL to the link circuit SRG by means of a selector RSL. The earlier communication between A and REGC is released. The subscriber receives a new dialling tone, this time from the register REGL.

The calling identification for outgoing calls from the subscriber's line L is carried out in the following manner. At a call from the subscriber's instrument A in FIG. 1 the line relay LR operates in a circuit from +, the contact 11, the line L and the subscriber's instrument A, the contact 12, the upper winding of the relay LR, the contact 100, to negative. All line relays LR in a group of 1000 subscribers are connected to the contact 100. The contact 10 is actuated and closes the following circuit: +, the contacts 123, 118, 116, the winding of the relay RB1, the contacts 103 . . . 123, 113, 111, the winding of relay RA, the contact 10, the rectifier $e2$, the winding of the relay RC10, the contacts 131, 133, 142 . . . 140, the winding of the relay RD5, the contacts 151, 153, 162 . . . 165. The relays RB1, RA1, RC10 and RD5 operate. The contacts 115–118, 111–114, 131–135 and 151–154 are actuated. The relay chains RA, RB, RC, RD are so arranged that only one relay at a time in each chain can remain operated.

Through the wires T$v$ the markers SLM and ARM are called, whereupon signals are sent through the bundles of conductor wires T$n$, T$s$, T$g$ for identifying the multiple position of the subscriber's line. The selectors SLA are supposed to be able to reach 2×10 lines each, and therefore the 1000 subscriber's lines of one group are divided into 50 subgroups, which have a wire each in the bundle of conductor wires T$g$. The contacts 154 and 134 close a circuit through the wire $g50$ which means that the subscriber's line L belongs to the subgroup 50. The contacts 114 and 115 close circuits through the wires $s1$ and $v1$ which indicate that the subscriber's line L is connected to the 1st position in the first 10-number in the selectors SLA. Thus with the aid of the relay means AD a line L is identified, the line relay LR of which is operated. Only one line at a time can be identified.

Incoming calls to the subscriber's line L are connected to a junction line $a1$, $b1$, $c1$ in FIG. 3. To the junction line belong a line equipment LCR and a selector SLC2. When the junction line is occupied by an incoming call, LCR will be connected to the identifier KD and to the translator KM that receives signals from the junction line concerning the called subscriber's number. These signals may be of any suitable kind, for example code signals with voice frequency combinations. The signals are converted in KM into a subscriber's number or into a multiple position and translator KM connects itself to the marker ARM. The marker ARM receives the subscriber's number from translator KM and sets up a communication between the junction line equipment LCR and the called subscriber's line through the selectors SLC2, SLD, SLB and SLA.

When the junction line *a*1, *b*1, *c*1 in FIG. 3 is occupied, the holding relay TR4 operates in a circuit through the test wire *c*1. The contacts 341–343 are actuated. The following circuit is completed: +, the contacts 343, 331, 314, 303, the winding of the relay FR8, the lower winding of the relay RL1, the contacts 211, 213, 202 . . . 210, the lower winding of the relay RT, the contacts 221, 223, 233 . . . 243, to negative. The relays FR8, RL1 and RT1 operate. The contacts 381–383, 211–214, 221–225 are actuated. The relay chains RL1–RL10, RT1–RT*n*, RS1-RS*m* are so designed that only one relay at a time in each chain can remain operated. The identifier is intended for a number of groups of each 10 junction lines and a number of link circuits SCR. The contact 224 shows in translator KM that a call has come to the identifier KD. The contacts 214 and 225 indicate that the calling junction line *a*1, *b*1, *c*1 has the number 1 in the group number 1. Through the speaking wires *a*1, *b*1 and the contacts 381, 382 signals arrive at KM, which indicate the number of the called subscriber's line, for example L in FIG. 1.

Here it is presupposed that the line L with the subscriber's instrument A in FIG. 1 corresponds to the telephone number of a PBX-subscriber having a number of subscriber's instruments, the incoming calls of which are received by a telephone operator at the instrument A and from here are transferred to the person asked for.

After the translator KM has received the number of the called line L, KM connects itself through the bundle of conductor wires T*a* to the marker ARM and signals are sent through the wires T*k* and the identifier KD for pointing out the calling junction line *a*1, *b*1, *c*1. The called number and the identity of the junction line are transferred to ARM which then sets up a communication from LCR in FIG. 3 through selectors SLC2, SLD, SLB, SLA to the line L in FIG. 1. Hereby a circuit is closed from ARM through T*a* and KM, the wire *t*9, the contact 383, the lower winding of the holding magnet MC2 for the selector SLC2 and the upper winding of the relay FR1, to negative. The holding magnet MC2 and the relay FR1 operate. The contacts 301, 303 and 311–314 are actuated. The relay FR8 releases its armature . The magnet MC2 is then held in a circuit through the contacts 342, 391, 301. The relay is held in a circuit through the contacts 343, 331 and 313. The relay BR in FIG. 1 operates in a circuit through the rectifier *e*3, the contact 341 and the *c*-wire of the communication.

Repeated ringing signals are now sent out from the ringing generator G through the impulse contact P and the transformer T through the following ringing circuit: +, the upper secondary winding of the transformer T, the contacts 321 and 311, the selectors SLC2, SLD, SLB, SLA, the winding L and the instrument A, the contacts 312 and 323, the upper winding of the slow-operating ringing relay FR2, the lower secondary winding of the transformer T, to negative. Upon answer from the subscriber's instrument A the relay FR2 operates. The contacts 321–325 are actuated. The ringing is interrupted by the contacts 321 and 323. The relay FR2 is then held in a circuit through the contacts 342 and 325. A communication is established throught the contacts 322 and 324. The instrument A receives current feed through the windings of the relays FR10 and FR3. The windings of the relay FR3 counteract each other so that the relay cannot operate its armature.

If the call shall be transferred to the desired subscriber's instrument, the push button K of the instrument A is pressed down. Ground potential is connected to the *a*-wire and the upper winding of the relays FR10 and FR3 are short-circuited. Hereby the relay FR3 operates owing to the current through its lower winding and the contact 331 is actuated. The relay FR1 releases its armature and the speech connection with the instrument A is broken. The cut-off relay BR in FIG. 1 is however held in said circuit through the *c*-wire. The relay FR3 releases its armature when the contacts 311–312 open.

The following circuit is completed: +, the contacts 343, 331, 314, 302, 373, the winding of the relay FR6, the lower winding of the relay RL1, the contacts 211, 213, 202 . . . 210, the lower winding of the relay RT1, the contacts 221, 223, 233 . . . 243, to negative. The relays FR6, RL1 and RT1 operate, whereby a call from the line *a*1, *b*1, *c*1 is marked and is identified in KM and KD respectively. The contacts 361–363 are actuated. The translator KM connects itself to the marker ARM, whereupon a positive potential is connected to the wire *t*8. The relay RU in FIG. 1 is operated from ARM. The following circuit is completed: the current source B of said +-potential, KM, the wire *t*8, the contacts 362, 341, the *c*-wire in SLC2, SLD, SLB, SLA, the lower winding of the line relay LR, the rectifier *e*1, the intermediate circuit MK, the upper winding of the relay XR, to earth. The relays LR and XR operate. The contact 10 is actuated. The relays RB1, RC10 and RD5 operate, the multiple position of the subscriber's line L thereby being pointed out for SLM. The operation of relay XR is without importance in this case as the marker ARM is not connected to a register REGC. The calling marker SLM is connected to the marker ARM which as has been described above for local connections from the subscriber's instrument A, connects the line L with a register REGC.

The marker ARM closes a circuit from +, through T*a*, KM, the wire *t*9, the contact 363, the upper winding of the relay FR7, to negative. The relay FR7 operates. The contacts 371–373 are actuated. The relay FR6 releases its armature. Then the relay FR7 is held in a circuit through the contacts 343, 331, 314, 302, 372, the lower winding of the relay FR7, to negative. The junction line *a*1, *b*1, *c*1 is therewith suspended.

The operator of the instrument A hears a buzzing sound from the register REGC and dials the local number of another subscriber's line, for instance, L′ in FIG. 1. A local communication is set up between the instrument A and that subscriber's instrument A′, with which the incoming line *a*1, *b*1, *c*1 shall be connected together. Hereby the marker SLM selectes a disengaged link circuit SCR with the aid of a circuit throught the wire *t*2 in FIGS. 2 and 4 and the contacts 502, 513 in the link circuit, whereupon the holding magnet MB of the selector SLB is operated in a circuit through the wire *t*3. The feeding relay R4 in SCR according to FIG. 4 operates in the following circuit: ground, the upper winding of the relays R5 and R4, the selectors SLB, SLA, the line L and the instrument A, the lower winding of the relays R4 and R5, to negative. The contact 441 is closed. The slow-operating holding relay R6 operates. The contacts 460–466 are actuated. The magnet MB is held in a circuit through the contacts 471, 465 and 501. The relays R1 and R2 are operated in a circuit through the contacts 471, 465 and 511. The contacts 411–416 and 421–422 are actuated. The cut-off relay BR in FIG. 1 has operated at the same time and is held in the following circuit: +, the rectifier E5, the resistance *r*1 and the contact 462 or the contact 463, the *c*-wire, the winding of the cut-off relay BR, to negative. The contacts 11 and 12 are actuated. The line relay LR releases and the calling identifier AD is released. The windings of the signal relay R5 counteract each other and for that reason relay R5 does not operate in the feeding circuit above.

A register REGC is connected simultaneously to the link circuit SCR through the contacts 411–416 and the selectors RSC. The register is selected from the marker SLM in a circuit through the wire t0. The register REGC is set by means of signals, impulse series or voice frequency signals from the instrument A in accordance with the local number of that subscriber's instrument, for instance, A′ in FIG. 1, to which the call is to be transferred. Then the register REGC is connected to the marker ARM and the called local number is transferred from REGC to ARM simultaneously as a positive potential is connected to the c-wire of the communication through the contacts 413, 463 and the register RV in FIG. 1 is operated. The line relay LR and the group relay XR operate. The operation of LR is in this case without importance as the call marker SLM cannot be connected to the marker ARM when this is occupied, and cannot then enter into function. The contact 50 is closed and indicates for ARM which PBX-subscriber is intended. The combination of the signals from XR and REGC indicate the called subscriber's line L′.

After the contact 50 has been closed, XR will be kept energized in a circuit through the lower winding of the relay, the contact 50 and the wire n1 and signal receiving means in ARM which are connected when a register REGC for local traffic is connected to ARM and a local number, that is, not to the digit 0 for outgoing traffic, has been registered. The circuit through the c-wire is interrupted, so that the line relay LR releases. The relay XR is held from the marker ARM by means of its lower winding in the circuit through the wire n1 and the contact 50. The marker ARM connects itself to the marker SLM and points out the called line with the aid of the number registering and the said link circuit SCR by means of a circuit through the contact 414 and the wire t1. The marker SLM selects and connects a communication between SCR and the called line through the selectors CLC1, SLD, SLB and SLA, a circuit for operation of the holding magnet MC1 to the selector SLC1 in FIG. 4 being completed from SLM through ARM, REGC, RSC, the contact 415 and the lower winding of the magnet MC1. The contacts 511–513 are actuated. The holding current of the relay R1 is interrupted by the contact 511, whereby the relay R1 releases and the register and the markers are released. The holding magnet MC1 is held in a circuit through the contacts 471, 465 and 512 and the upper winding of MC1. The relay R2 is held operated through the contacts 466, 451, 421.

Figure 4:
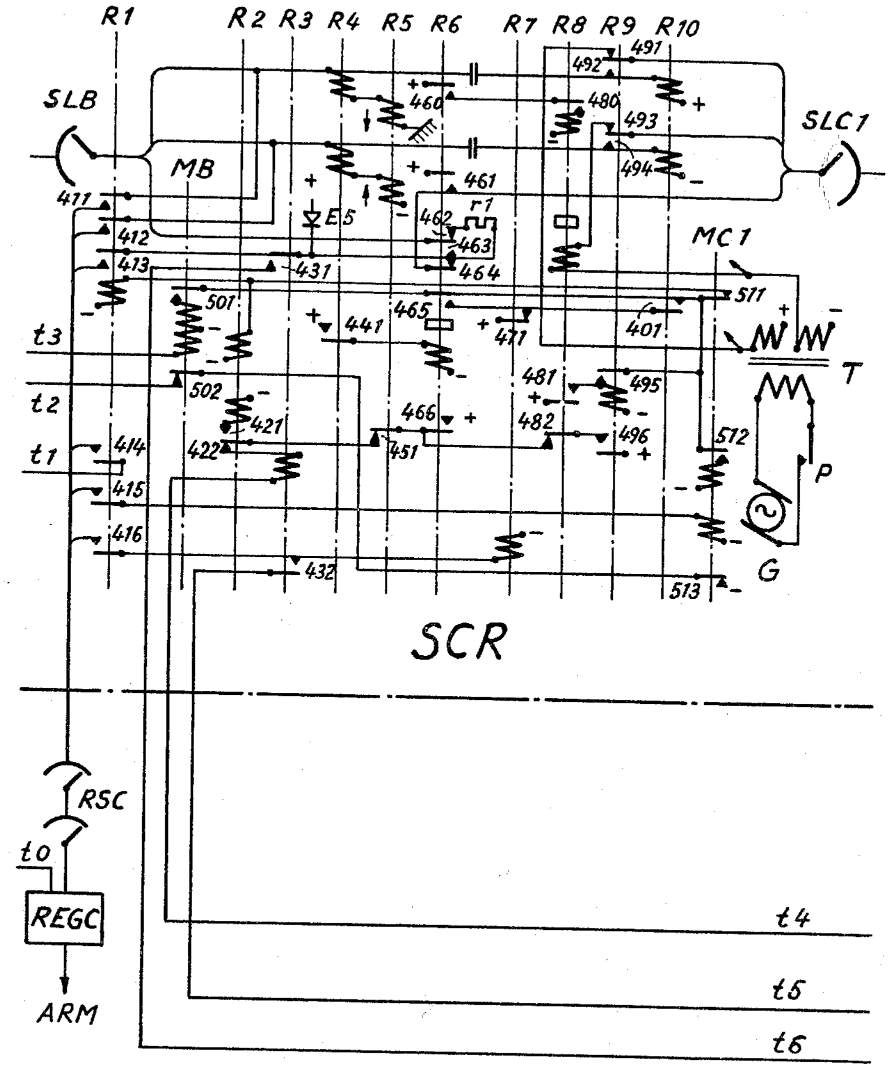
FIG. 4 shows a link circuit for local communications.

A communication has now been set up through the link circuit SCR and ringing signal is sent to the called line in the following circuit: +, the link secondary winding of the transformer T, the contact 491, the selectors SLC1, SLD, SLB, SLA, the called line, the contact 493, the lower winding of the slow-operating ringing relay R8, the right secondary winding of the transformer T, to negative. Repeated ringing signals are sent from the generator G through the primary winding of the transformer T by means of an impulse contact P. The ringing means G, T, P in FIG. 4 is the same as G, T, P in FIG. 3.

When the called subscriber answers, the relay R8 will operate. The contacts 480–482 are actuated. The relay R9 becomes energized and operates. The contacts 491–496 are operated. The relay R8 is held in a circuit through the contacts 460 and 480 through the upper winding of the relay. The feeding relay R10 operates. The contact 401 is closed.

The operator at the telephone subscriber A reports the incoming call and replaces the handset. The relays R4, R6, R8 release. The relay R2 releases during the release time of the relay R8, whereupon the magnets MB and MC1 and the relay R9 are kept energized through the contacts 471, 401 and 501, 511 and 495 respectively.

The following circuit is completed: +, the contacts 496, 482, 451, 422, the winding of the relay R3, the wire t4, the winding of the relay RSm in FIG. 3, the contacts 253, 251 . . . 261, 271, the winding of the relay RTn, the contacts 241, 223, 233 . . . 243, to negative. The relays R3, RSm and RTn operate. The contacts 431–432, 251–255 and 241–244 are actuated. The link circuit SCR is then connected to the translator KM which in its turn connects itself to the marker ARM. When KM has been connected to ARM, contacts are closed in KM whereby earth potential is connected to the wire t7. The following circuits are completed: B, KM, t7, the contact 255, the wire t6, the contact 431, on one hand to the resistance r1, the contact 462, SLB, SLA, the c-wire of the operator's line L, SLA, SLB, SLD, SLC2, the contacts 341 and 361, the winding of the relay FR5, the rectifier e4, the wire t10, contact in KM, to earth, on the other hand to the contact 464, SLC1, SLD, SLB, SLA, the wire C′ of the line L′, to which the call shall be transferred, the lower winding of the line relay LR′ of said line, the rectifier e1′, MK, the upper winding of the group relay XR, to earth.

The circuit described above is branched also through the line relay LR of the line L of the operator but this relay is shunted by the relay FR5 that has a low resistance so that a considerable voltage drop arises in the resistance r1, for which reason it does not become energized.

The relay FR5 in the line equipment LCR of the suspended junction line in FIG. 3 and the relays LR′ and XR of that subscriber's line to which the call shall be transferred, operate. The contacts 351–353 in FIG. 3 and the contact 50 in FIG. 1 and the contact of the relay LR′ are actuated. In a circuit through the contact 353 the relays RL1 and RT1 are operated. The contacts 211–214 and 221–225 are actuated, whereby the waiting junction line a1, b1, c1 is identified by the identifier KD and the marker ARM. A relay in each of the relay chains RB1–RB2 and RD1–RD5 and a relay RA and a relay RC in FIG. 1 operate, whereby the called subscriber's line is identified. The markers SLM and ARM set up a communication between a1, b1, c1 and the line L′, ARM closing a circuit from + through Ta, KM, the wire t9, the contacts 351, 371, the winding of the relay FR9, to negative. The relay FR9 operates. The contacts 391–392 are actuated. The magnet MC2 releases its armature, so that the selector SLC2 is released, which causes that the relay FR5 releases and the current of the relay FR9 is interrupted. During the release time of the slow-operating relay FR9 the magnet MC2 is again operated together with the relay FR1 through a circuit from the wire t9, through the contacts 352 and 392. When the relay FR9 releases, the identifier KD, the translator KM and the markers SLM and ARM are released. The link circuit SCR is released through the following circuit: +, the contact 254, the wire t5, the contacts 432, the winding of the relay R7, to negative. The relay R7 operates. The contact 471 is actuated. The magnets MB and MC1 and the relay R9 release, so that the selectors SLB and SLC1 are restored. The relays R10 and R3 release.

Then the junction line a1, b1, c1 is connected to that subscriber's line which has been selected by the operator at the instrument A. Switching processes which occur upon connection of local communications and outgoing communications are not described in detail, because they are not essential for the invention, and because they are of a similar kind to those described above for transfer of an incoming call.

After a call has been transferred from a PBX-subscriber's operator to another subscriber's instrument the condition within the line equipment LCR is the same as at calls with the operator. The call can therefore be transferred further, if desired. An enquiry call is however often connected without intending transfer. The subscriber wishes in this case to connect himself back to the waiting junction line. In the link circuit SCR according to FIG. 4 the holding magnets MB and MC1 of the selectors SLB and SLC1 respectively remain operated, and at least the relays R2, R4 and R6. In the line equipment LCR according to FIG. 3 the holding magnet MC2 of the selector SLC2 and the relays FR2, FR4 and FR7 remain operated.

The subscriber, for example the operator at the subscriber's instrument A in FIG. 1, which has connected the enquiry call through the local link circuit SCR, presses signal button K. The upper winding of the relays R4 and R5 are short-circuited. The relay R4 is held and the relay R5 operates in consequence of the current through the lower windings. The contacts 451 are actuated. The relay R2 releases its armature. The following circuit is completed when the button K is released and the relay R5 again releases its armature: +, the contacts 466, 451, 422, the winding of the relay R3, the wire *t4*, the winding of the relay RS*m*, the contacts 253, 251 . . . 261, 271, the winding of the relay RT*n*, the contacts 241, 223, 233 . . . 243, to negative. The relay R3 RS*m* and RT*n* operate. The contacts 431–432, 251–255, 241–244 are actuated. The translator KM is connected to the marker ARM which on one hand operates the calling marker AD in FIG. 1, so that the relay RU operates, on the other hand operates the translator KM, so that ground is connected to the wire *t10* and the battery B is connected to the wire *t7*.

The subscriber's line L is pointed out through the circuit: B, KM, *t7*, the contact 255, the wire *t6*, the contacts 431 and 463, the *c*-wire in the selectors SLB, SLA, the lower winding of the line relay LR, the rectifier *e1*, the intermediate circuit MK, the upper winding of the PBX-group relay XR, to earth. The contact 10 is closed and the relays RB1, RA1, RC10 and RD5 operate. The junction line *a1*, *b1*, *c1* is pointed out through the circuit: B, KM, *t7*, the contact 255, the wire *t6*, the contacts 431 and 463, the *c*-wire in selectors SLB, SLA—SLA, SLB, SLC2 the contacts 341, 361, the winding of the relay FR5, the rectifier *e4*, the wire *t10*, to earth in the translator KM. The relay FR5 operates. The contacts 351–353 are actuated. The relays RL1 and RT1 operate. A communication is connected as has been described above between the subscriber's line L and the junction line *a1*, *b1*, *c1*. The link circuit SCR is released when the marker has been released and the relay RS*m* releases by operation of the releasing relay R7.

In the description above has been mentioned that, for an outgoing call from the subscriber's line L, the line is first connected to a local link circuit SCR and to a register REGC according to FIG. 4. Then the direction digit 0 will be dialled. The register REGC connects itself to the marker ARM which operates the relay RU in FIG. 1, identifies a disengaged, outgoing link circuit SRG and a disengaged register REGL and identifies simultaneously the calling line L by connecting a positive potential, i.e. the battery B in FIG. 3, to a circuit through the register REGC, the selectors RSC, the contacts 413, 463, SLB, SLA, the lower winding of LR, *e1*, MK, XR, to ground. A communication is connected between the subscriber's line L and the register REGL. At the same time the local link circuit SCR is released by closing a circuit from + in ARM through REGC, RSC, the contact 416, the winding of the releasing relay R7, to negative.

I claim:

1. In an automatic telephone exchange, subscribers' lines, crossbar switches, links, registers and a marker cooperating with said registers and switches to set up communications between said lines, a multiple-digit number being assigned to each of said lines, several of said subscribers' lines forming a separate group of lines, additional crossbar switches, links and registers being provided for said group, some of the lines in said group forming sub-groups, an individual short telephone number being assigned to each line in each sub-group for use for traffic between the lines within the sub-group; a relay for each sub-group; means for connecting a calling line on one of said sub-groups through said additional crossbar switches to one of said additional registers; means operating the relay of the respective sub-group from said register when the short telephone number of a called subscriber's line is registered in the register and the register is connected to the marker, the marker receiving said short number from the register cooperating with said relay to set up a connection between the calling line and the subscriber's line within the sub-group which corresponds to the registered short telephone number.

2. An automatic telephone exchange according to claim 1 and comprising incoming links for traffic to the subscriber's lines in said separate group of lines, relay means in each of said incoming links operated by signals from a called subscriber's instrument connected to the link, said relay means in one position coacting with the marker, holding the incoming call and marking the called subscriber's line for a local connection and in another position connecting the incoming call to the called subscriber's line.

3. An automatic telephone exchange according to claim 2 and comprising relay means in each of said additional links, said relays being operated by signals from a subscriber's instrument connected as calling part to the link and when operated coacting with the marker for marking the called part and a waiting incoming link previously connected to the calling part of the additional link to be connected together.

References Cited by the Examiner

UNITED STATES PATENTS

| | | | |
|---|---|---|---|
| 2,424,563 | 7/47 | Gohorel | 179—27 |
| 2,496,902 | 2/50 | Voss | 179—27 |
| 2,993,094 | 7/61 | Danielsen | 179—27 |

ROBERT H. ROSE, *Primary Examiner.*

L. MILLER ANDRUS, STEPHEN W. CAPELLI, *Examiners.*